(12) United States Patent
Tomeo et al.

(10) Patent No.: US 9,366,145 B2
(45) Date of Patent: Jun. 14, 2016

(54) TURBINE ENGINE ROTOR ASSEMBLY

(75) Inventors: Peter V. Tomeo, Middletown, CT (US);
Carney R. Anderson, East Haddam, CT (US); William Richard Ganoe, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 933 days.

(21) Appl. No.: 13/593,587

(22) Filed: Aug. 24, 2012

(65) Prior Publication Data

US 2014/0056713 A1 Feb. 27, 2014

(51) Int. Cl.
*F01D 5/30* (2006.01)
*B23C 3/30* (2006.01)
*B24B 19/02* (2006.01)
*B21D 53/00* (2006.01)

(52) U.S. Cl.
CPC ............... *F01D 5/3007* (2013.01); *B23C 3/30* (2013.01); *B24B 19/02* (2013.01); *B23C 2220/366* (2013.01); *Y10T 29/49316* (2015.01)

(58) Field of Classification Search
CPC ....... F01D 5/30; F01D 5/3007; F01D 5/3015; F05D 2230/10; F05D 2230/14; B23C 3/30; B23C 2220/266; B24B 19/02; Y10T 29/49316
USPC ........ 416/204 R, 219 R, 239, 248; 415/209.3
See application file for complete search history.

(56) References Cited

U.S. PATENT DOCUMENTS

| 974,496 | A | * | 11/1910 | Duston | 416/220 R |
|---|---|---|---|---|---|
| 5,112,193 | A | * | 5/1992 | Greer et al. | 416/220 R |
| 5,720,596 | A | * | 2/1998 | Pepperman | 416/220 R |
| 6,439,851 | B1 | * | 8/2002 | Wong | 416/219 R |
| 6,739,837 | B2 | | 5/2004 | Barnette et al. | |
| 6,883,234 | B2 | | 4/2005 | Packman et al. | |
| 7,007,382 | B2 | * | 3/2006 | Mantel | 29/889.2 |
| 7,244,105 | B2 | | 7/2007 | Moeller | |
| 7,690,896 | B2 | | 4/2010 | Stevens et al. | |
| 7,761,992 | B2 | | 7/2010 | Packman et al. | |
| 7,927,069 | B2 | | 4/2011 | Erickson et al. | |
| 8,000,942 | B2 | | 8/2011 | El-Wardany et al. | |
| 8,011,892 | B2 | | 9/2011 | Ramlogan et al. | |
| 2011/0176925 | A1 | | 7/2011 | Anderson et al. | |

* cited by examiner

*Primary Examiner* — Craig Kim
*Assistant Examiner* — Alexander White
(74) *Attorney, Agent, or Firm* — O'Shea Getz P.C.

(57) ABSTRACT

A turbine engine rotor assembly includes a turbine engine rotor disk that extends axially along a centerline between a first disk end and a second disk end, and radially to an outer disk surface. The rotor disk includes one or more blade retention slots arranged circumferentially around the centerline. A first of the blade retention slots extends axially into the rotor disk from a disk end surface at the first disk end to a slot end surface, and radially into the rotor disk from the outer disk surface to a slot base surface.

20 Claims, 7 Drawing Sheets

TURBINE ENGINE ROTOR ASSEMBLY

BACKGROUND OF THE INVENTION

1. Technical Field

This disclosure relates generally to a turbine engine and, more particularly, to a turbine engine rotor assembly having a rotor disk with one or more blade retention slots.

2. Background Information

A turbine engine typically includes a fan section, a compressor section, a combustion section and a turbine section, which are sequentially arranged along an axial centerline between a forward airflow inlet and an aft airflow exhaust. The fan section, the compressor section and the turbine section may each include one or more rotor assemblies. Each of the rotor assemblies may include a plurality of rotor blades circumferentially arranged about a respective rotor disk. Each of the rotor blades may include a blade root, which is mated with a respective blade retention slot in the rotor disk to connect the rotor blade to the rotor disk. Typically, the blade retention slot extends axially through the rotor disk between a forward disk end and an aft disk end. Such a blade retention slot configuration, however, may permit air to leak through the slot across the rotor disk, which may decrease turbine engine efficiency. Such a blade retention slot configuration may also reduce the structural integrity of the rotor disk since there is no rotor disk structure tying the between slot portions of the rotor disk together.

SUMMARY OF THE DISCLOSURE

According to one aspect of the invention, a turbine engine rotor assembly is provided that includes a turbine engine rotor disk. The rotor disk extends axially along a centerline between a first disk end and a second disk end, and radially to an outer disk surface. The rotor disk includes one or more blade retention slots arranged circumferentially around the centerline. A first of the blade retention slots extends axially into the rotor disk from a disk end surface at the first disk end to a slot end surface (e.g., in absence of extending completely axially through the rotor disk). The first of the blade retention slots also extends radially into the rotor disk from the outer disk surface to a slot base surface. The rotor assembly may also include one or more rotor blades arranged circumferentially around the centerline. A first of the rotor blades includes a blade root that may be mated with the first of the blade retention slots. An axial blade retention element may be connected to the first disk end adjacent to the disk end surface to axially retain the blade root in the first of the blade retention slots.

The first of the blade retention slots may include a neck portion and a root portion adapted to mate with the blade root. The neck portion extends radially from the outer disk surface to the root portion, and has a lateral first slot width. The root portion extends radially from the neck portion to the slot base surface, and has a lateral second slot width that is greater than the first slot width.

The rotor disk may include a first aperture that extends radially from the outer disk surface to the root portion, and laterally from the neck portion to a first aperture side surface. The first aperture may be axially located proximate the slot end surface. The first aperture may have a circular segment cross-sectional geometry. The rotor disk may also include a second aperture that extends radially from the outer disk surface to the root portion, and laterally from the neck portion to a second aperture side surface. The first of the blade retention slots may extend laterally between the first aperture and the second aperture. A lateral aperture width may be defined between the first aperture side surface and the second aperture side surface. The aperture width may be greater than, less than or substantially equal to the second slot width.

The first disk end may be configured as a forward (e.g., upstream) disk end, and the second disk end may be configured as an aft (e.g., downstream) disk end. In another embodiment, the first disk end may be configured as the aft disk end, and the second disk end may be configured as the forward disk end.

The rotor disk may be configured as a fan rotor disk, and the rotor blades may be configured as fan blades. In another embodiment, the rotor disk may be configured as a compressor rotor disk, and the rotor blades may be configured as compressor blades. In still another embodiment, the rotor disk may be configured as a turbine rotor disk, and the rotor blades may be configured as turbine blades.

According to another aspect of the invention, a method is provided for manufacturing a turbine engine rotor disk having one or more blade retention slots. The rotor disk extends axially along a centerline between a first disk end and a second disk end, and radially to an outer disk surface. The blade retention slots are arranged circumferentially around the centerline. The method includes machining a first slot into the rotor disk with at least a first rotating cutting tool. The first slot extends axially from a disk end surface at the first disk end to a first slot end surface, and radially from the outer disk surface to a first slot base surface. One or more surfaces of the first slot are subsequently machined with at least a second rotating cutting tool to provide a first of the blade retention slots.

The method may also include machining a first aperture into the rotor disk with a third rotating cutting tool. The first aperture extends radially from the outer disk surface to the root portion, and laterally from the neck portion to a first aperture side surface. The method may still also include machining a second aperture into the rotor disk with the third rotating cutting tool, for example, concurrently to the machining of the first aperture. The second aperture extends radially from the outer disk surface to the root portion, and laterally from the neck portion to a second aperture side surface. The first slot may extend laterally between the first aperture and the second aperture.

During the machining of the one or more surfaces of the first slot, the second rotating cutting tool may enter the first slot at the first disk end and exit the first slot through the aperture. In another embodiment, the second rotating cutting tool may enter the first slot through the aperture and exit the first slot at the first disk end. In still another embodiment, the second rotating cutting tool may enter and/or exit the first slot at the first disk end. Similarly, the first rotating cutting tool may begin and/or finish the machining of the first slot at the first disk end.

The foregoing features and the operation of the invention will become more apparent in light of the following description and the accompanying drawings.

DETAILED DESCRIPTION OF THE INVENTION

Figure 1:
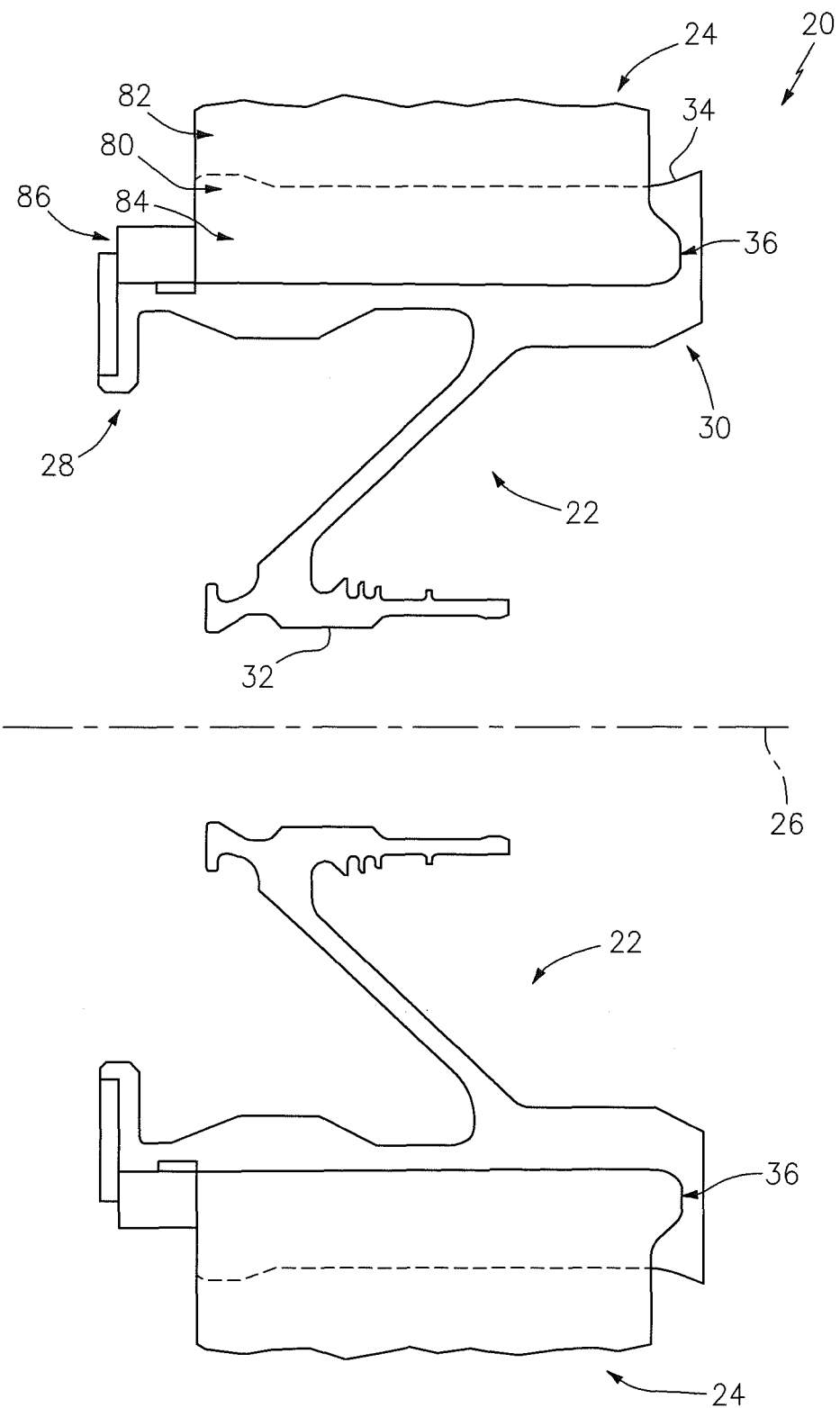
FIG. 1 is a side-sectional illustration of a turbine engine rotor assembly that includes a plurality of rotor blades arranged circumferentially around a rotor disk.

FIG. 1 illustrates a turbine engine rotor assembly 20 that includes a turbine engine rotor disk 22 and a plurality of turbine engine rotor blades 24. The rotor disk 22 extends axially along a centerline 26 between a first disk end 28 and a second disk end 30. The rotor disk 22 extends radially between a radial inner disk surface 32 (e.g., an engine shaft engagement surface) and a radial outer disk surface 34 (e.g., a flow path surface). The rotor disk 22 also extends circumferentially around and is rotatable about the centerline 26.

Figure 2:
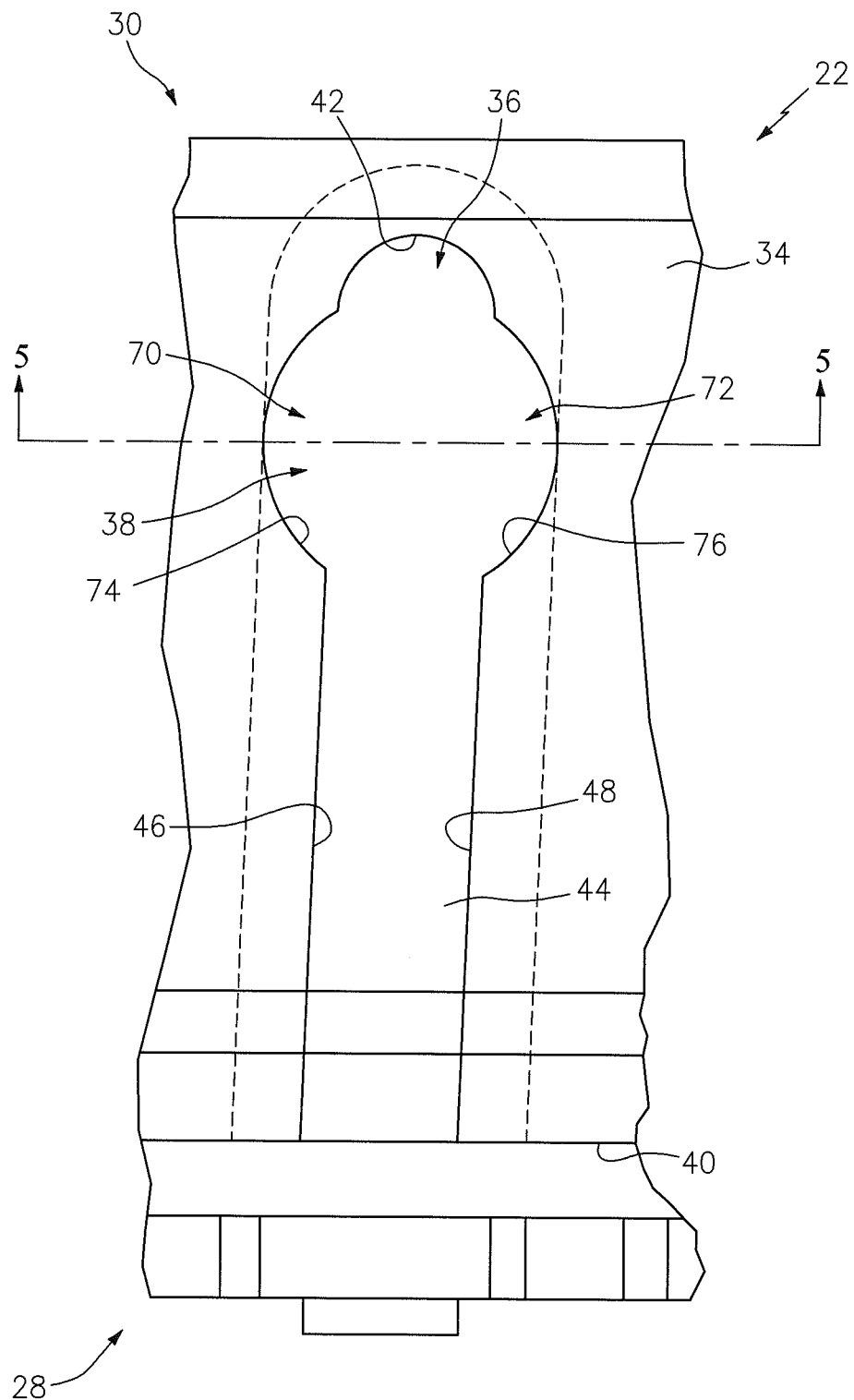
FIG. 2 is a side view illustration of a section of the rotor disk.
Figure 3:
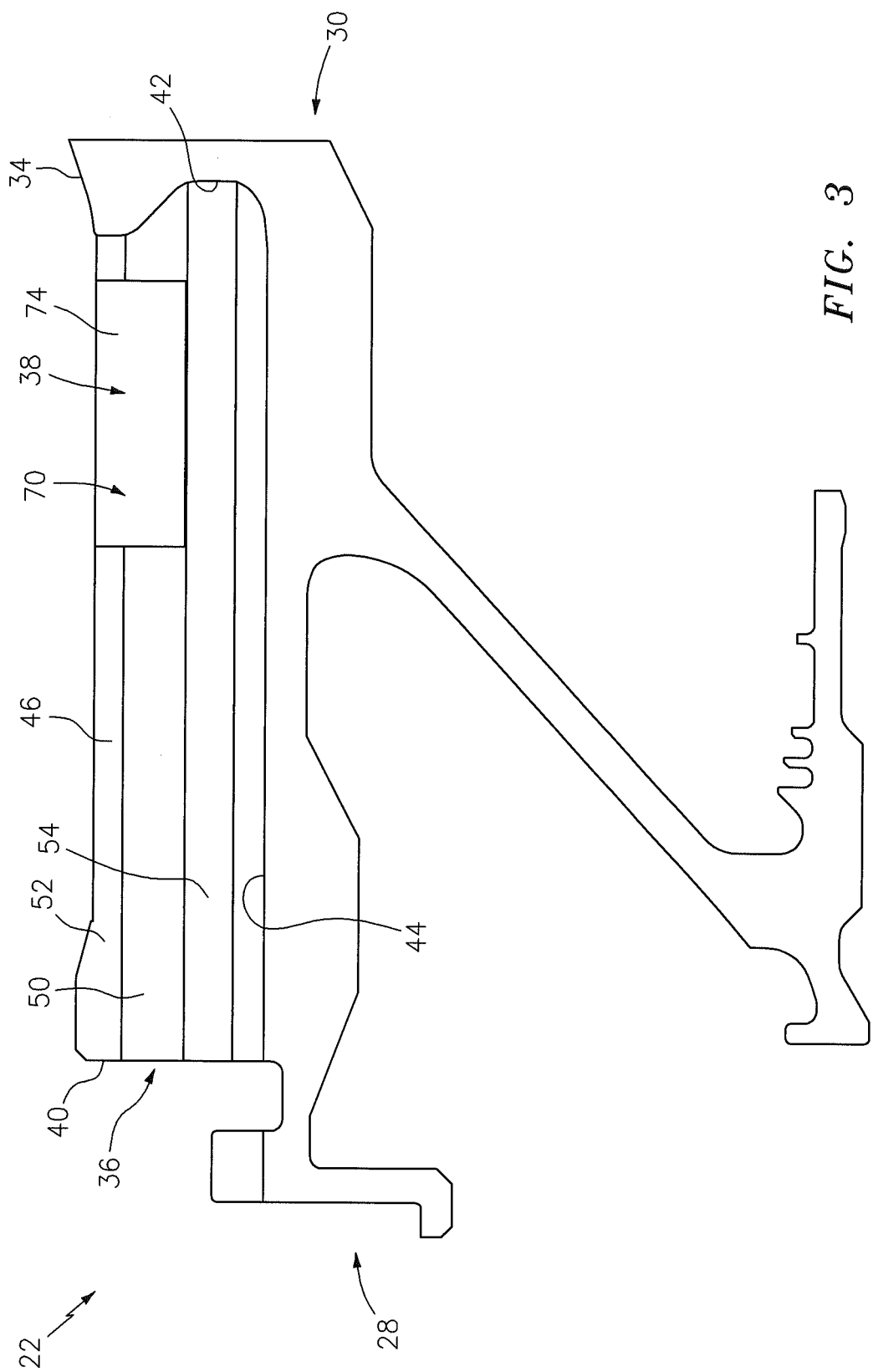
FIG. 3 is a side-sectional illustration of a section of the rotor disk.

The rotor disk 22 includes a plurality of blade retention slots 36 arranged circumferentially around the centerline 26. Referring now to FIGS. 2 and 3, the rotor disk 22 may also include a plurality of tool keyways 38 respectively arranged with the blade retention slots 36.

Figure 4:
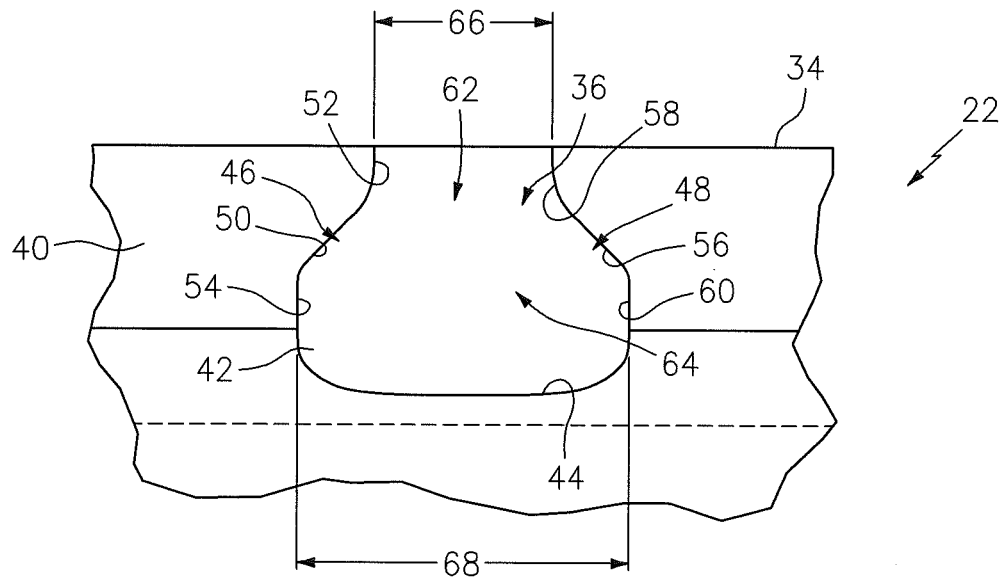
FIG. 4 is a first (e.g., front) end view illustration of a section of the rotor disk.

Referring to FIGS. 2 to 4, each of the blade retention slots 36 extends partially, axially into the rotor disk 22 from a first disk end surface 40 at (e.g., adjacent or proximate to) the first disk end 28 to a respective slot end surface 42, in absence of extending completely through the rotor disk 22. Each of the blade retention slots 36 extends radially into the rotor disk 22 from the outer disk surface 34 to a respective slot base surface 44. Each of the blade retention slots 36 also extends laterally (e.g., tangentially or circumferentially) between a first slot side surface 46 and a second slot side surface 48.

Referring to FIG. 4, the first and/or the second slot side surfaces 46 and 48 have tortuous geometries adapted for rotor blade 24 retention, which is described below in further detail. The first slot side surface 46, for example, may include a plurality of surface segments such as a first root overhang segment 50 that extends between a first neck side segment 52 and a first root side segment 54. The second slot side surface 48 may also (or alternatively) include a plurality of surface segments such as a second root overhang segment 56 that extends between a second neck side segment 58 and a second root side segment 60. The slot base surface 44 extends laterally between the first and the second root side segments 54 and 60.

Each of the blade retention slots 36 respectively includes a neck portion 62 and a root portion 64, which are defined by the slot base and side surfaces 44, 46 and 48. The neck portion 62 extends radially from the outer disk surface 34 to, for example, outer radial ends of the first and the second root overhang segments 50 and 56. The neck portion 62 has a lateral first slot width 66 that extends between, for example, innermost portions of the first and the second neck side segments 52 and 58. The root portion 64 extends radially from the neck portion 62 to the slot base surface 44. The root portion 64 has a lateral second slot width 68 that extends between, for example, outermost portions of the first and the second root side segments 54 and 60. The second slot width 68 is greater than the first slot width 66.

Figure 5:
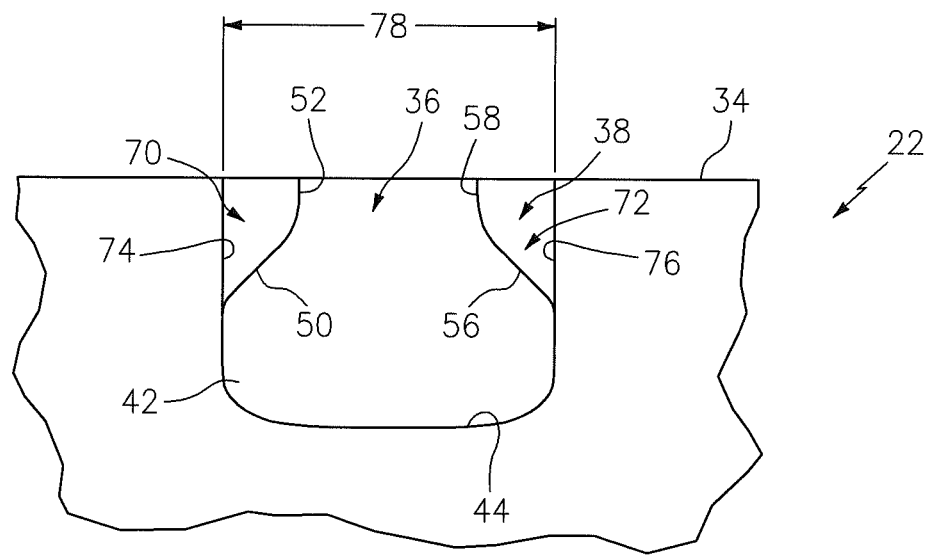
FIG. 5 is a cross-sectional illustration of the rotor disk of FIG. 2.

Referring to FIGS. 2, 3 and 5, each of the tool keyways 38 includes one or more keyway apertures 70 and 72, which may be axially aligned and/or arranged on opposite sides of a respective one of the blade retention slots 36. Each of the keyway apertures 70, 72 extends radially from the outer disk surface 34 to, for example, a respective one of the root overhang segments 50, 56. A first of the keyway apertures 70 extends laterally from the first neck side segment 52 to a first aperture side surface 74. A second of the keyway apertures 72 extends laterally from the second neck side segment 58 to a second aperture side surface 76. Referring to FIG. 2, each of the keyway apertures may have a circular segment cross-sectional geometry.

Referring to FIG. 5, each of the tool keyways 38 has a lateral aperture (keyway) width 78 that extends between, for example, outermost portions of the first and the second aperture side surfaces 74 and 76. The aperture width 78 is greater than the first slot width 66, and may be substantially equal to the second slot width 68 as illustrated in FIGS. 4 and 5. Alternatively, the aperture width 78 may be greater than or less than the second slot width 68.

Referring to FIG. 1, the rotor blades 24 are arranged circumferentially around the centerline 26, and respectively mated with the blade retention slots 36. Each of the rotor blades 24 may include, for example, a blade neck 80 arranged radially between a blade airfoil 82 and a blade root 84. Each blade neck 80 is mated with the neck portion 62 (see FIG. 4) of a respective one of the blade retention slots 36. Each blade root 84 is mated with the root portion 64 (see FIG. 4) of a respective one of the blade retention slots 36. The rotor blades 24 may be axially secured within the blade retention slots 36 using an axial blade retention element 86 connected, for example, to the first disk end 28 adjacent the first disk end surface 40. The present invention, however, is not limited to any particular blade retention element type and/or configuration.

In the rotor disk 22 embodiment illustrated in FIG. 1, the first disk end 28 is configured as a forward (e.g., upstream) disk end and the second disk end 30 is configured as an aft (e.g., downstream) disk end. In alternative embodiments, however, the first disk end 28 may be configured as the aft disk end and the second disk end 30 may be configured as the forward disk end.

In the rotor disk 22 embodiment illustrated in FIG. 2, the tool keyway 38 is illustrated as being located proximate the slot end surface 42. The present invention, however, is not limited to any particular tool keyway location. In alternative embodiments, for example, the tool keyway may be located adjacent to the slot end surface or centrally between the first and the second disk ends.

In some embodiments, the rotor assembly 20 embodiment illustrated in FIG. 1 may be configured as a fan rotor assembly. The rotor disk 22, for example, may be configured as a fan rotor disk, and the rotor blades 24 may be configured as turbine engine fan blades. In other embodiments, the rotor assembly 20 may be configured as a compressor rotor assembly. The rotor disk 22, for example, may be configured as a compressor rotor disk, and the rotor blades 24 may be configured as turbine engine compressor blades. In still other embodiments, the rotor assembly 20 may be configured as a turbine rotor assembly. The rotor disk 22, for example, may be configured as a turbine rotor disk, and the rotor blades 24 may be configured as turbine engine turbine blades.

A person of ordinary skill in the art will recognize that one or more of the blade retention slots 36 and/or one or more of the tool keyways 38 may have configurations other than those described above and/or illustrated in the drawings. In some embodiments, for example, the root portion of one or more of the blade retention slots may have a fir-tree type configuration. In other embodiments, the first and/or the second apertures may have a non-circular segment cross-sectional geometry. The present invention therefore is not limited to any particular blade retention slot and/or tool keyway configurations.

Figure 6:
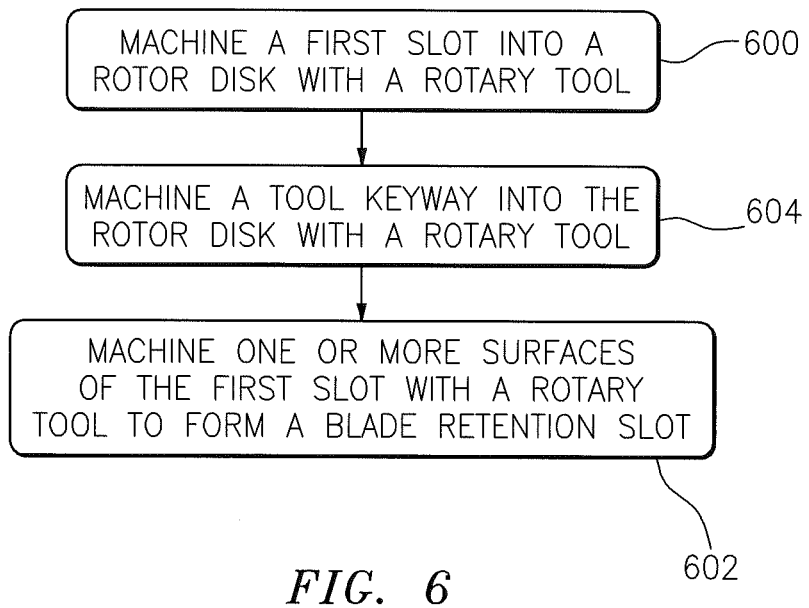
FIG. 6 is a flow diagram of a method for manufacturing a rotor disk.
Figure 7:
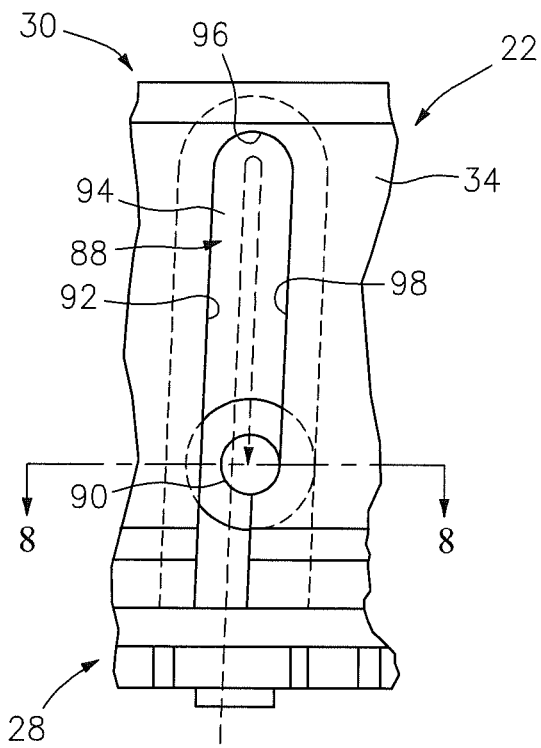
FIG. 7 is a side view illustration of a section of the rotor disk during a first step of the method of FIG. 6.
Figure 8:
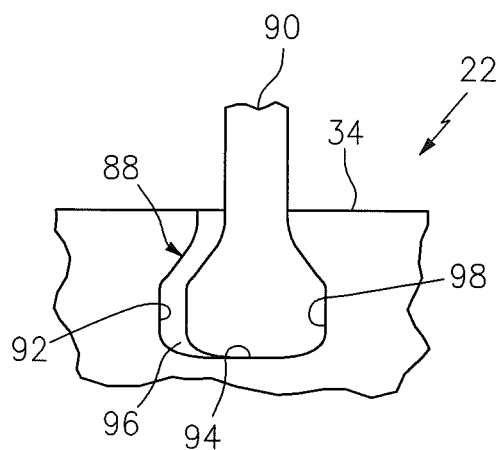
FIG. 8 is a cross-sectional illustration of the rotor disk of FIG. 7.

FIG. 6 is a flow diagram of a method for manufacturing a rotor disk 22. Referring to FIGS. 6, 7 and 8, in step 600, a first slot 88 (e.g., a rough cut/preform slot) is machined into the rotor disk 22 using at least a first rotary cutting tool 90 (e.g., a rotary super abrasive quill, a rotary T-cutter mill, etc.). The first rotary cutting tool 90, for example, may engage the rotor disk 22 at the first disk end 28, and move axially towards the second disk end 30 to form a first side surface 92 and a portion of a base surface 94 of the first slot 88. The first rotary cutting tool 90 may then move laterally to form an end surface 96 of the first slot 88 proximate the second disk end 30. The first rotary cutting tool 90 may then move axially back towards the first disk end 28 to form a second side surface 98 and a remaining portion of the base surface 94 of the first slot 88. In this manner, the first rotary cutting tool 90 begins and finishes the machining of the first slot 88 at the first disk end 28.

Figure 9:
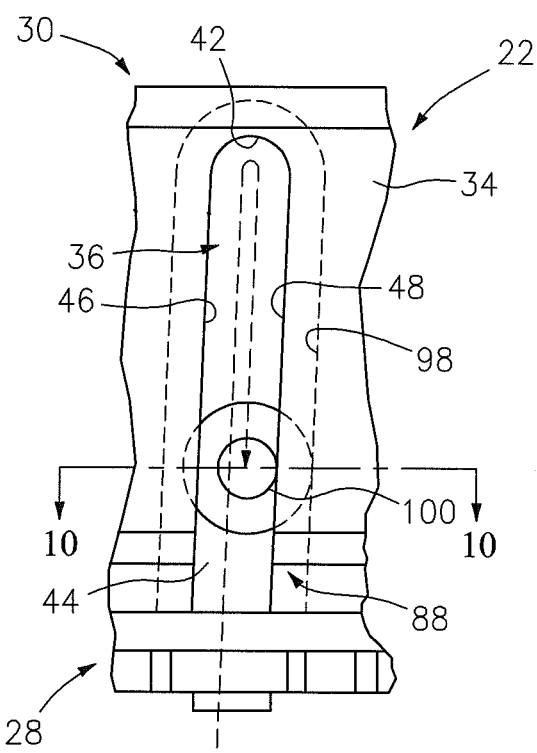
FIG. 9 is a side view illustration of a section of the rotor disk during a second step of the method of FIG. 6.
Figure 10:
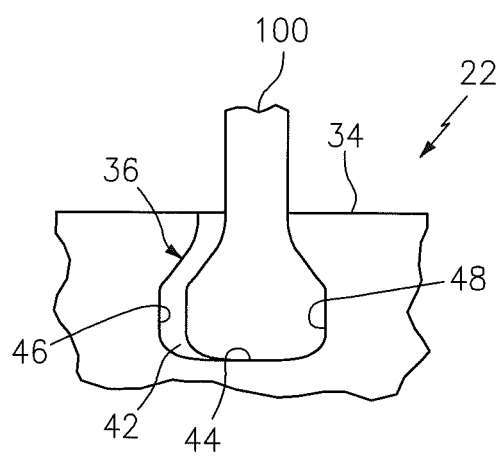
FIG. 10 is a cross-sectional illustration of the rotor disk of FIG. 9.

Referring to FIGS. 6, 9 and 10, in step 602, one or more of the surfaces of the first slot 88 are machined using at least a second rotary cutting tool 100 (e.g., a rotary super abrasive quill, a rotary T-cutter mill, etc.) to provide the blade retention slot 36. The second rotary cutting tool 100, for example, may engage the first side surface 92 and a portion of the base surface 94 at the first disk end 28. The second rotary cutting tool 100 may then be moved axially towards the second disk end 30 to form the first slot side surface 46 and a portion of the slot base surface 44. The second rotary cutting tool 100 may then engage the end surface 96, and move laterally to form the slot end surface 42. The second rotary cutting tool 100 may then engage the second side surface 98 and the remaining portion of the base surface 94, and move axially back towards the first disk end 28 to form the second slot side surface 48 and a remaining portion of the slot base surface 44. In this manner, the second rotary cutting tool 100 begins and finishes the machining of the blade retention slot 36 at the first disk end 28.

Figure 11:
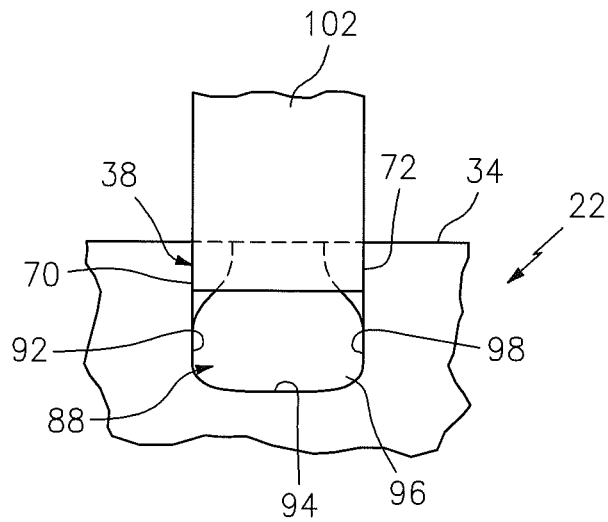
FIG. 11 is a cross-sectional illustration of a section of the rotor disk during a third step of the method of FIG. 6.

Referring to FIGS. 6 and 11, the method may also include an additional step 604 in which the tool keyway 38 is machined into the rotor disk 22 using a third rotary cutting tool 102 (e.g., a drill, an end mill, etc.). The third rotary cutting tool 102, for example, may engage the outer disk surface 34, and subsequently plunge into the rotor disk 22 towards the base surface 94 of the first slot 88 to form the tool keyway 38. The third rotary cutting tool 102 therefore may form both of the apertures 70 and 72 concurrently.

The step 602 may be performed subsequent to the step 604 such that the second rotary cutting tool 100 may enter the first slot 88 at the first disk end 28, and exit the first slot 88 through the tool keyway 38. Alternatively, the second rotary cutting tool 100 may enter the first slot 88 through the tool keyway 38, and exit the first slot 88 at the first disk end 28.

The steps 600, 604 and 602 may be sequentially repeated at one or more other circumferential locations around the rotor disk 22 in order to machine one or more additional blade retention slots 36 and tool apertures 38. Alternatively, one or more of the steps may be performed at each of the circumferential locations before performing a subsequent one of the steps. The step 600, for example, may be performed to machine the first slots 88 at each of the circumferential locations. The step 604 may then be performed to machine the tool keyway 38 at each of the circumferential locations. The step 602 may then be performed to machine the blade retention slots 36 at each of the circumferential locations.

A person of skill in the art will recognize that the blade retention slots 36 and/or the tool keyways 38 may be machined using techniques and/or steps other than those described above and illustrated in the drawings. In some embodiments, for example, the rotary cutting tools may be sized to machine the first slot and/or the blade retention slot in a single axial pass. In other embodiments, the rotary cutting tools may be operated to make a lateral pass before advancing axially towards the first or second disk end 28, 30. The present invention, therefore, is not limited to any particular manufacturing steps and/or techniques.

Figure 12:
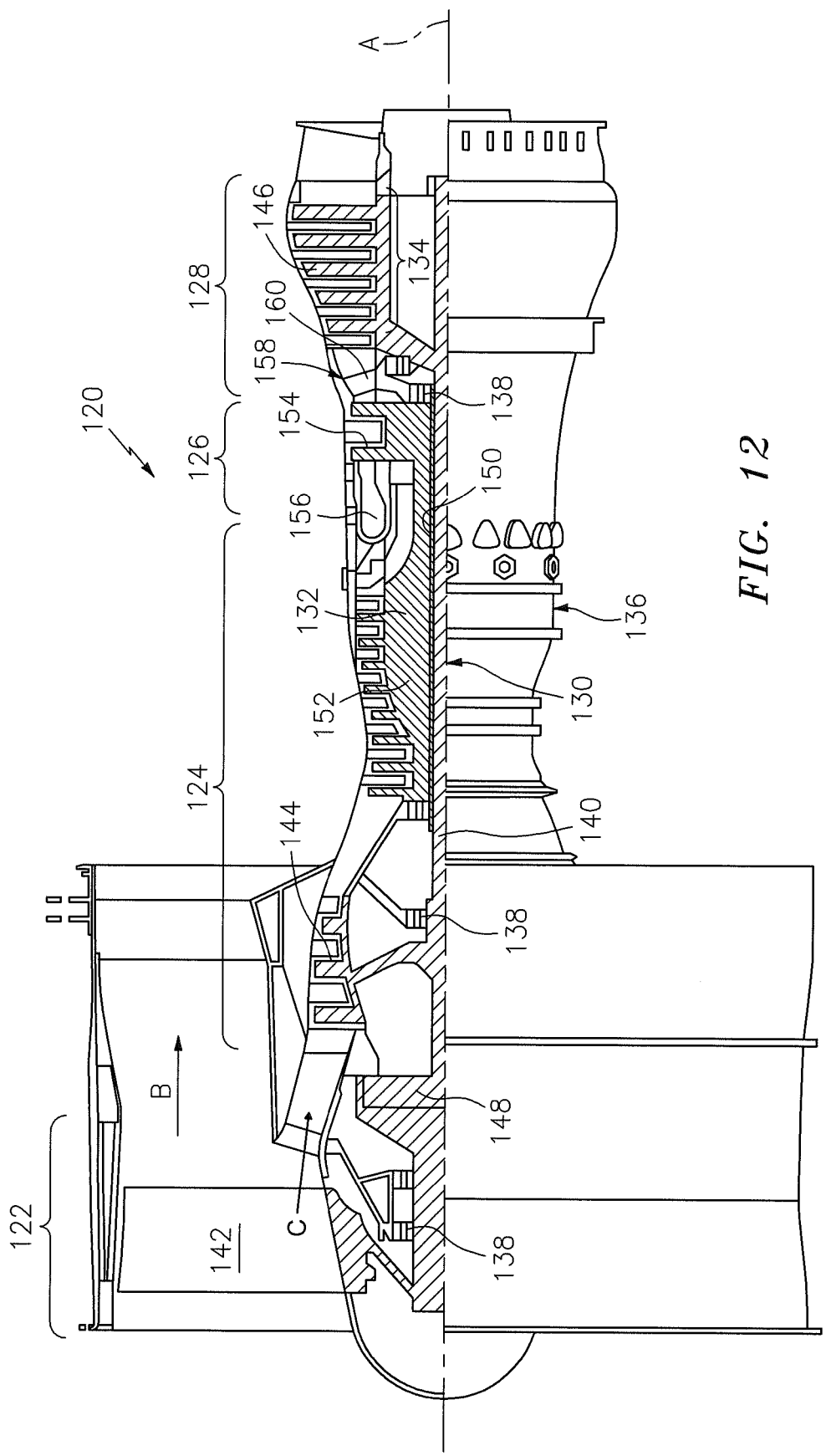
FIG. 12 is a side-cutaway illustration of a turbine engine.

FIG. 12 illustrates a turbine engine 120 that includes a plurality of turbine engine sections, one or more of which may include one or more of the rotor assemblies 20 of FIG. 1. The turbine engine 120 may include, for example, a fan section 122, a compressor section 124, a combustor section 126 and a turbine section 128. Alternative engines may also include an augmenter section (not shown) among other systems and/or features. The fan section 122 drives air along a bypass flow path B while the compressor section 124 draws air in along a core flow path C, where air is compressed and communicated to the combustor section 126. In the combustor section 126, air is mixed with fuel and ignited to generate a high pressure exhaust gas stream that expands through the turbine section 128 where energy is extracted and utilized to drive the fan section 122 and the compressor section 124.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section 124, and a high spool that enables a high pressure turbine to drive a high pressure compressor of the compressor section 124.

The turbine engine 120 generally includes a low speed spool 130 and a high speed spool 132 mounted for rotation about an engine central longitudinal axis A relative to an engine static structure 136 via a plurality of bearing systems 138. It should be understood various bearing systems 138 at various locations may alternatively or additionally be provided.

The low speed spool 130 generally includes an inner shaft 140 that connects a fan 142 and a low pressure (or first) compressor section 144 to a low pressure (or first) turbine section 146. The inner shaft 140 drives the fan 142 through a speed change device, such as a geared architecture 148, to drive the fan 142 at a lower speed than the low speed spool 130. The high-speed spool 132 includes an outer shaft 150 that interconnects a high pressure (or second) compressor section 152 and a high pressure (or second) turbine section 154. The inner shaft 140 and the outer shaft 150 are concentric and rotate via the bearing systems 138 about the engine central longitudinal axis A.

A combustor 156 is arranged between the high pressure compressor 152 and the high pressure turbine 154. In one example, the high pressure turbine 154 includes at least two stages to provide a double stage high pressure turbine 154. In another example, the high pressure turbine 154 includes only a single stage. As used herein, a "high pressure" compressor or turbine experiences a higher pressure than a corresponding "low pressure" compressor or turbine.

The low pressure turbine 146 has a pressure ratio that is greater than about five. The pressure ratio of the example low pressure turbine 146 is measured prior to an inlet of the low pressure turbine 146 as related to the pressure measured at the outlet of the low pressure turbine 146 prior to an exhaust nozzle.

A mid-turbine frame 158 of the engine static structure 136 is arranged generally between the high pressure turbine 154 and the low pressure turbine 146. The mid-turbine frame 158 further supports bearing systems 138 in the turbine section 128 as well as setting airflow entering the low pressure turbine 146.

The core airflow C is compressed by the low pressure compressor 144 then by the high pressure compressor 152 mixed with fuel and ignited in the combustor 156 to produce high speed exhaust gases that are then expanded through the high pressure turbine 154 and low pressure turbine 146. The mid-turbine frame 158 includes vanes 160, which are in the core airflow path and function as an inlet guide vane for the low pressure turbine 146. Utilizing the vane 160 of the mid-turbine frame 158 as the inlet guide vane for low pressure turbine 146 decreases the length of the low pressure turbine 146 without increasing the axial length of the mid-turbine frame 158. Reducing or eliminating the number of vanes in the low pressure turbine 146 shortens the axial length of the turbine section 128. Thus, the compactness of the turbine engine 120 is increased and a higher power density may be achieved.

The turbine engine 120 in one example is a high-bypass geared aircraft engine. In another example, the turbine engine 120 includes a bypass ratio greater than about six (6), with an example embodiment being greater than about ten (10). The example geared architecture 148 is an epicyclical gear train, such as a planetary gear system, star gear system or other known gear system, with a gear reduction ratio of greater than about 2.3

In one disclosed embodiment, the turbine engine 120 includes a bypass ratio greater than about ten to one (10:1) and the fan diameter is significantly larger than an outer diameter of the low pressure compressor 144. It should be understood, however, that the above parameters are examples of one embodiment of a turbine engine including a geared architecture and that the present disclosure is applicable to other turbine engines.

A significant amount of thrust is provided by the bypass flow B due to the high bypass ratio. The fan section 122 of the engine 120 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The turbine engine 120 includes the fan 142 that includes in one non-limiting embodiment less than about 126 fan blades. In another non-limiting embodiment, the fan section 122 includes less than about 120 fan blades. Moreover, in one disclosed embodiment the low pressure turbine 146 includes no more than about 6 turbine rotors schematically indicated at 134. In another non-limiting example embodiment the low pressure turbine 146 includes about three turbine rotors. A ratio between the number of fan blades 142 and the number of low pressure turbine rotors is between about 3.3 and about 8.6. The example low pressure turbine 146 provides the driving power to rotate the fan section 122 and therefore the relationship between the number of turbine rotors 134 in the low pressure turbine 146 and the number of blades 142 in the fan section 122 disclose an example turbine engine 120 with increased power transfer efficiency.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine rotor assembly, comprising:
    a monolithic turbine engine rotor disk extending axially along a centerline between a first disk end and a second disk end, and radially to an outer disk surface, the rotor disk comprising one or more blade retention slots arranged circumferentially around the centerline;
    wherein a first of the blade retention slots extends axially partially into the rotor disk from a disk end surface at the first disk end to a slot end surface of the rotor disk, and radially into the rotor disk from the outer disk surface to a slot base surface.

2. The rotor assembly of claim 1, wherein
    the first of the blade retention slots comprises a neck portion and a root portion adapted to mate with a blade root of a rotor blade;
    the neck portion extends radially from the outer disk surface to the root portion, and comprises a lateral first slot width; and
    the root portion extends radially from the neck portion to the slot base surface, and comprises a lateral second slot width that is greater than the first slot width.

3. The rotor assembly of claim 2, wherein the rotor disk further comprises an aperture that extends radially from the outer disk surface to the root portion, and that extends laterally from the neck portion to an aperture side surface.

4. The rotor assembly of claim 3, wherein
    the aperture is a first aperture;
    the rotor disk further comprises a second aperture that extends radially from the outer disk surface to the root portion, and that extends laterally from the neck portion to a second aperture side surface; and
    the first of the blade retention slots extends laterally between the first aperture and the second aperture.

5. The rotor assembly of claim 4, wherein the aperture side surface is a first aperture side surface, a lateral aperture width is defined between the first aperture side surface and the second aperture side surface, and the aperture width is greater than or substantially equal to the second slot width.

6. The rotor assembly of claim 3, wherein the aperture is axially located proximate the slot end surface.

7. The rotor assembly of claim 3, wherein the aperture comprises a circular segment cross-sectional geometry.

8. The rotor assembly of claim 1, wherein the first disk end comprises a forward disk end, and the second disk end comprises an aft disk end.

9. The rotor assembly of claim 1, further comprising one or more rotor blades arranged circumferentially around the centerline, wherein a first of the rotor blades comprises a blade root that is mated with the first of the blade retention slots.

10. The rotor assembly of claim 9, wherein the rotor disk is configured as a fan rotor disk, and the rotor blades are configured as fan blades.

11. The rotor assembly of claim 9, wherein the rotor disk is configured as a compressor rotor disk, and the rotor blades are configured as compressor blades.

12. The rotor assembly of claim 9, wherein the rotor disk is configured as a turbine rotor disk, and the rotor blades are configured as turbine blades.

13. The rotor assembly of claim 9, wherein the rotor disk further comprises an axial blade retention element connected to the first disk end adjacent to the disk end surface.

14. A method for manufacturing a turbine engine rotor disk comprising one or more blade retention slots, the rotor disk extending axially along a centerline between a first disk end and a second disk end and radially to an outer disk surface, the blade retention slots arranged circumferentially around the centerline, the method comprising:
    machining a first slot into the rotor disk with at least a first rotating cutting tool, the first slot extending axially from a disk end surface at the first disk end partially into the rotor disk to a first slot end surface which forms an end of the first slot, and radially from the outer disk surface to a first slot base surface; and
    machining one or more surfaces of the first slot with at least a second rotating cutting tool to provide a first of the blade retention slots.

15. The method of claim 14, wherein
the first of the blade retention slots comprises a neck portion and a root portion;
the neck portion extends radially from the outer disk surface to the root portion, and comprises a lateral first slot width; and
the root portion extends radially from the neck portion to a slot base surface, and comprises a lateral second slot width that is greater than the first slot width.

16. The method of claim 15, further comprising machining an aperture into the rotor disk with a third rotating cutting tool, wherein the aperture extends radially from the outer disk surface to the root portion, and extends laterally from the neck portion to an aperture side surface.

17. The method of claim 16, wherein the aperture comprises a first aperture, and further comprising machining a second aperture into the rotor disk with the third rotating cutting tool concurrently to the machining of the first aperture, wherein the second aperture extends radially from the outer disk surface to the root portion, and extends laterally from the neck portion to a second aperture side surface, and wherein the first slot extends laterally between the first aperture and the second aperture.

18. The method of claim 16, wherein the second rotating cutting tool enters the first slot at the first disk end and exits the first slot through the aperture during the machining of the one or more surfaces of the first slot.

19. The method of claim 16, wherein the second rotating cutting tool enters the first slot through the aperture and exits the first slot at the first disk end during the machining of the one or more surfaces of the first slot.

20. A method for manufacturing a turbine engine rotor disk comprising one or more blade retention slots, the rotor disk extending axially along a centerline between a first disk end and a second disk end and radially to an outer disk surface, the blade retention slots arranged circumferentially around the centerline, the method comprising:
    machining a first slot into the rotor disk with at least a first rotating cutting tool, the first slot extending axially from a disk end surface at the first disk end to a first slot end surface, and radially from the outer disk surface to a first slot base surface; and
    machining one or more surfaces of the first slot with at least a second rotating cutting tool to provide a first of the blade retention slots;
    wherein the first rotating cutting tool begins and finishes the machining of the first slot at the first disk end, and the second rotating cutting tool enters and exits the first slot at the first disk end during the machining of the one or more surfaces of the first slot.

* * * * *